Sept. 27, 1966   W. F. DIEHL   3,274,834
APPARATUS FOR FLUID PRESSURE MEASUREMENT
Filed Nov. 20, 1963
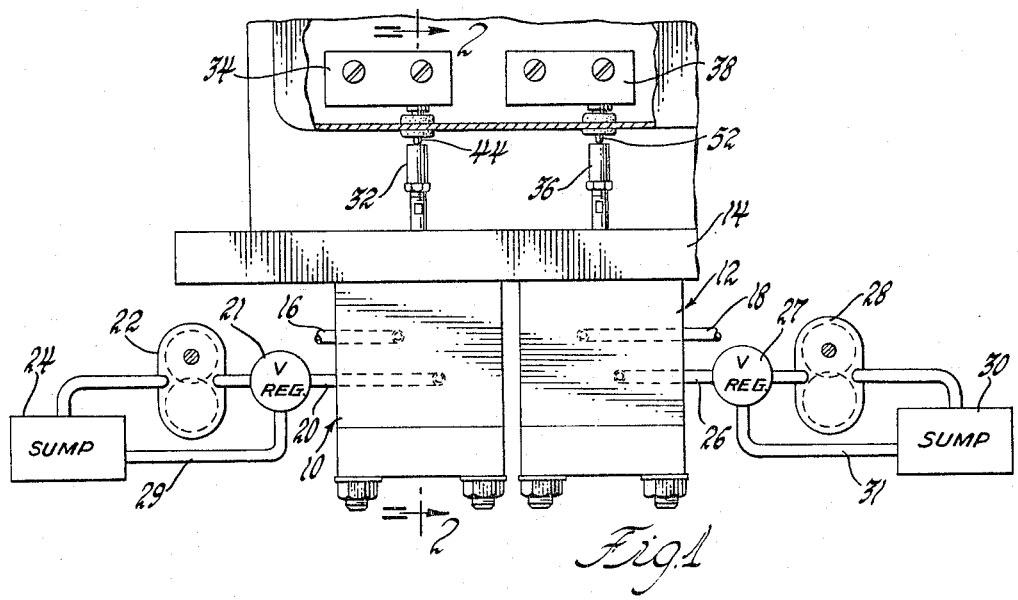
Fig. 1
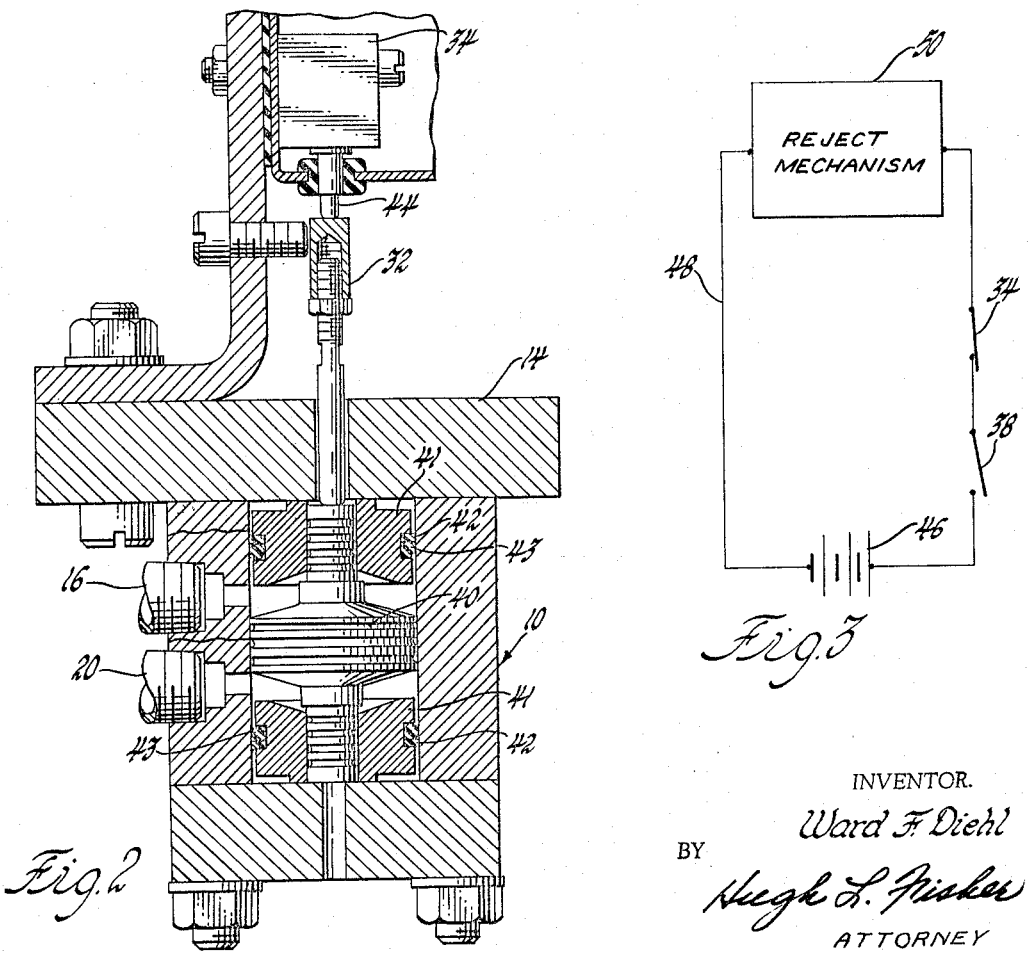
Fig. 2
Fig. 3
INVENTOR.
Ward F. Diehl
BY
Hugh L. Fisher
ATTORNEY 3,274,834
APPARATUS FOR FLUID PRESSURE
MEASUREMENT
Ward F. Diehl, New Baltimore, Mich., assignor to General
Motors Corporation, Detroit, Mich., a corporation of
Delaware
Filed Nov. 20, 1963, Ser. No. 325,111
1 Claim. (Cl. 73—419)

This invention relates to apparatus for determining whether an unknown fluid pressure is within a predetermined pressure range.

There are many industrial applications wherein it is desired to determine that a fluid pressure is within a predetermined pressure range. For example, various mechanical parts, such as valves, may be tested prior to incorporating the parts into an assembly to determine that they are operating properly. Parts such as valves may only be acceptable if the resistance to fluid flow under a variety of conditions presented by the valve or other hydraulic component is within an acceptable range.

By application of the present invention, the desired testing may be accomplished by flushing a quantity of fluid, such as oil, through the parts to be tested and comparing the back pressure caused by the resistance to fluid flow within the part to pressure standards which define the acceptable range. More specifically, the fluid pressure created by the resistance to fluid flow of the part is compared in a first pressure comparator to a pressure standard which defines the maximum acceptable pressure. The unknown pressure is, at the same time, compared to a low pressure which defines the minimum acceptable pressure by means of a second pressure comparator. The two pressure comparators then provide respective indications concerning the pressure ratios. These indications are interpreted by responsive means such as output circuitry to determine whether or not the unknown pressure is within the acceptable range defined by the maximum and minimum pressure standards. In this manner, the acceptability of the part under test may be indicated and the part may be rejected in the event the pressure comparison is unfavorable.

A specific apparatus for carrying out the invention as described above is shown in the accompanying drawings of which:

FIGURE 1 is a side view of a pressure comparison system employing twin comparators and pressure standards;

FIGURE 2 is a cross-sectional view of one of the pressure comparators; and

FIGURE 3 is a simplified schematic of the output circuit means used to interpret the results of the pressure comparison.

Briefly describing the invention, it should be first understood that the objective satisfied thereby is the determination of whether an unknown fluid pressure falls within a predetermined pressure range which is defined by maximum and minimum pressure standards. This may be accomplished by means of two pressure comparators, each of which has a displaceable comparison member such as a piston. The comparison is carried out by admitting the unknown fluid pressure to one side of each of the displaceable members and admitting the maximum pressure to the other side of one of the displaceable members and the minimum pressure standards to the other side of the other of the displaceable members. When the unknown and standard pressures are thus admitted to opposite sides of the displaceable member, the members will either be displaced from a normal position or will remain in a normal position depending upon whether or not a favorable pressure ratio exists within the comparators. If, for example, the unknown pressure is greater than the maximum standard, the comparator to which the maximum standard is admitted will indicate an unfavorable pressure ratio by means of the displaceable member. Similarly, if the unknown pressure is lower than the minimum standard, a similar unacceptable or unfavorable indication will be made. It will be understood that both indications are necessary to determine that the unknown pressure is properly within the range. To interpret the significance of the displacements of the members, each member may be operatively associated with a switch which is responsive to displacement of the member to be conditioned accordingly. Circuit means connecting the switches may be energized at a predetermined time to determine the condition of each of the switches and to provide a signal for reject purposes in the event that one or both of the switches is in a condition indicating unfavorable pressure ratios in the comparators.

Referring now more specifically to FIGURE 1, there is shown a system including a pair of similar piston type pressure comparators 10 and 12. In the figures, the comparators 10 and 12 are fastened to a plate 14 by any common means. Each of the pressure comparators has admitted thereto two fluid pressures for comparison. The first of these is the unknown pressure which is admitted to both of the comparators 10 and 12 by means of inlet lines 16 and 18, respectively. Additionally, comparator 10, which may be termed the low pressure comparator, has admitted thereto a minimum fluid pressure standard by means of inlet line 20. The line 20 is connected through a pressure regulator valve 21 to a pump 22 which is supplied with hydraulic fluid or oil from a sump 24. The valve may be of the conventional type having a return line 29 to the sump 24. Similarly, the comparator 12, which may be termed the high pressure comparator, has a high or maximum fluid pressure standard admitted thereto by means of inlet line 26. The maximum pressure standard is provided by means of a pressure regulator valve 27 and a pump 28 to which hydraulic fluid is supplied by sump 30. Valve 27 is also provided with a fluid return line 31. The output indication from comparator 10 which is provided by way of piston displacement, as will become more apparent in the following, is communicated through a mechanical linkage in the form of an adjustable plunger 32 to a first precision limit switch 34 which is wired to be in a closed condition when plunger 32 is in the lower position. In a similar fashion, an adjustable plunger 36 connects the piston of comparator 12 to a second limit switch 38 which is wired to be in an open condition when plunger 36 is in the lower position.

Looking now to FIGURE 2, the pressure comparison technique and apparatus is shown in greater detail. It will be assumed that FIGURE 2 is illustrative of the low pressure comparator 10. The pressure comparator 10 is shown to include a displaceable piston 40 in metal-to-metal contact with the inside surface of the comparator 10 to provide a fast action. The cylindrical chamber within which the piston 40 is displaced is defined on the upper and lower sides thereof by means of the cylindrical members 41, sealing members 42 and O-rings 43. Axial travel of piston 40 is limited to a very small range by means of stops provided by abutment of the axially extended portions of the piston 40 with the plate 14 and the lower end plate of the comparator assembly. These stops are external to the fluid chamber of the comparators and thus produce no time-consuming fluid compression which would arise if the stops were located within the oil-filled chamber. During the actual test process, the low pressure standard applied via line 20 holds the piston 40 of the comparator 10 in the upward position prior to application of the unknown pressure on line 16. Upon admission of an unknown pressure, which is greater than the prescribed minimum, the pressure on line 16 is greater than that on line 20. Thus, the piston 40 of comparator 10 is displaced to the lower position as illustrated in the drawing. The position of the piston 40, both before and after the admission of the unknown pressure, is transmitted by means of a plunger 32 which is in intimate contact with the upper end of the piston 40 to the actuating member 44 of the limit switch 34. As previously stated, the limit switch 34 is open-circuited when the actuating member 44 is depressed or urged upwardly as shown in the drawing. Closure of the switch 34 upon admission of the unknown pressure indicates that the unknown pressure is greater than the minimum standard. However, should the pressure on line 16 be lower than that on line 20, piston 40 would be urged upwardly, the actuating member 44 would remain depressed, switch 34 would remain open and an unfavorable pressure ratio would be indicated.

For discussion purposes, it may be assumed that the low pressure comparator 10 receives on inlet line 20 a minimum pressure standard which is 10% lower than the normal pressure expected on inlet line 16. Inlet line 26 admits a fluid pressure to comparator 12 which is 10% higher than the pressure expected on line 18. These pressure standards are set by means of valves 27 and 21. As was previously made clear, the unknown fluid pressure is simultaneously communicated to inlet lines 16 and 18 after the standards have been applied to the comparators 10 and 12. Therefore, the acceptable range is defined as being plus or minus 10% about a normal pressure. Prior to admission of the unknown pressure, the pistons of both comparators 10 and 12 are in the raised position. If in the low pressure comparator 10, the unknown pressure admitted by inlet line 16 is greater than the minimum pressure standard on line 20, the piston is moved to the lower position and the pressure comparator 10 provides an indication by means of plunger 32 to switch 34. Release of the actuating member 44 allows switch 34 to close. However, if the pressure on inlet line 16 is less than the minimum on inlet line 20, linkage 32 is maintained in an upward direction causing switch 34 to remain open.

Looking to comparator 12, the pressure on inlet line 18, when applied, should be less than the maximum standard on line 26. Therefore, the piston in comparator 12 should remain in the upper position with respect to the system shown in the drawings after admission of the unknown pressure on line 18. Since switch 36 is wired to be closed when actuating member 52 is depressed, the switch is closed both before and after the admission of the unknown pressure, if it does not exceed the prescribed maximum. If, however, the pressure on line 18 unfavorably exceeds that on line 26, the piston is displaced downwardly allowing switch 38 to open. If at the end of the test either switch 34 or 38 is open, the pressure on lines 16 and 18 is known to be unfavorably high or low and the part causing this pressure may be rejected.

Looking to FIGURE 3, a simplified schematic of an output circuit which may connect the switches 34 and 38 is suggested. As previously stated, switch 34 is wired to be in the closed condition when plunger 32 is in the lower position and switch 38 is wired to be in the open condition when plunger 36 is lowered. However, when the pressure on lines 16 and 18 of FIGURE 1 is within the range defined by the maximum and minimum pressure standard pumps 22 and 28, plunger 32 is lowered, plunger 36 remains raised, and both of the switches 34 and 38 are closed. Accordingly, energy from a source 46 flows through the path indicated at 48 to a reject mechanism 50. The mechanism 50 is set up such that current flow prevents the energization of a reject door. This may be accomplished by means of a solenoid holding device which is maintained in an energized state by means of the circuit 48. However, should one of the pressure comparators indicate an unfavorable pressure ratio, one of the switches 34 or 38 is opened. The holding mechanism is then de-energized and the reject mechanism 50 rejects the part being tested. More specifically, a pressure which is lower than the 10% minimum defined by pump 22 causes plunger 32 to be maintained in an upward position, thus, preventing switch 34 from closing. This operates the reject mechanism 50. Alternatively, the unknown pressure as admitted by line 18 may exceed the 10% maximum defined by pump 28. In this case, the piston of comparator 12 is forced downwardly and the switch 38 is allowed to open. This also operates the reject mechanism 50. The reject mechanism 50 might readily be replaced with a simple indicator such as a light or buzzer. It is also to be understood that more sophisticated circuits than are shown will normally be used to energize the circuit 48 after the pressures applied to the comparators 10 and 12 have had a time to settle.

It is to be understood that various modifications to the specific embodiments described may be apparent to those skilled in the art, and for a definition of the invention, reference should be had to the appended claim.

What is claimed is:

Apparatus for determining whether the pressure exerted by a quantity of hydraulic oil is within a predetermined range comprising: first and second sources of hydraulic oil under respective high and low pressures definitive of said range; first and second pressure comparators each including an enclosing member defining a chamber, a two-sided piston displaceably disposed within the chamber and including portions extending axially outwardly of the chamber in both directions, and stop means adjacent but spaced from said portions for limiting the axial displacement of the piston; means for admitting oil from the first and second sources to one side of the pistons of the first and second comparators respectively; means for admitting said quantity of oil to the other side of the pistons; first and second switch means; first and second actuating plungers disposed in direct axial connection between the first and second pistons and the first and second switch means, respectively, for communicating the position of the pistons to the switch means thereby to condition the switch means accordingly, circuit means connecting the switch means for indicating whether the pressure of said quantity of oil is within said range.

References Cited by the Examiner
UNITED STATES PATENTS 2,707,389   5/1955   Fortier _____ 73—37.5
3,046,778   7/1962   Fortier _____ 73—37.5

LOUIS R. PRINCE, *Primary Examiner.*

JAMES RENJILIAN, *Assistant Examiner.*